United States Patent [19]

Sloughfy et al.

[11] 3,751,241

[45] Aug. 7, 1973

[54] METHOD FOR PRODUCING WEATHER-RESISTANT SUPERFLUXED METALLIZED PELLETS FROM IRON-BEARING FINES AND A SUPERFLUXED METALLIZED PELLET PRODUCED THEREBY

[75] Inventors: James L. Sloughfy; Lloyd V. Fegan, Jr., both of Allentown, Pa.

[73] Assignee: Bethlehem Steel Corporation, Bethlehem, Pa.

[22] Filed: Dec. 28, 1970

[21] Appl. No.: 101,740

[52] U.S. Cl. .............................. 75/3, 75/4, 75/25, 75/94
[51] Int. Cl. ........ C21b 1/08, C21b 1/28, C21b 3/04
[58] Field of Search .................... 75/3, 4, 5, 25, 26, 75/34, 94

[56] References Cited
UNITED STATES PATENTS

| | | | |
|---|---|---|---|
| 2,792,298 | 5/1957 | Freeman | 75/3 |
| 2,855,290 | 10/1958 | Freeman | 75/3 |
| 2,844,457 | 7/1958 | Amberg | 75/3 |
| 3,326,670 | 6/1967 | Bratton | 75/25 |
| 3,437,474 | 4/1969 | Imperato | 75/3 |
| 3,180,723 | 4/1965 | McCauley | 75/3 |
| 3,174,846 | 3/1965 | Brisse | 75/4 |
| 3,163,519 | 12/1964 | Hanson | 75/94 |
| 3,169,852 | 2/1965 | Price | 75/94 |
| 1,847,179 | 3/1932 | Genter | 75/25 |
| 2,750,273 | 6/1956 | Leller | 75/3 |
| 3,262,771 | 7/1966 | Ban | 75/3 |
| 3,382,063 | 5/1968 | Imperato | 75/3 |
| 3,125,438 | 3/1964 | Franklin | 75/3 |
| 3,097,945 | 7/1963 | Paris | 75/3 |

*Primary Examiner*—L. Dewayne Rutledge
*Assistant Examiner*—Peter D. Rosenberg
*Attorney*—Joseph J. O'Keefe

[57] ABSTRACT

A method for producing weather-resistant superfluxed metallized iron pellets from iron-bearing fines. A mix containing about 56 percent to about 85 percent iron-bearing fines, about twelve percent to about 40 percent flux material and about 3 percent to about 4 percent solid reductant is prepared. The mix is balled. A charge of balls, a flux and a solid reductant in a weight ratio of 100 pounds:5 pounds:100/200 pounds respectively is placed in one end of a rotary kiln. The charged materials are heated to about 1,900° F. for a time sufficient to calcine the flux materials and to reduce 90 percent of the iron to the ferrous state. The charged materials are further heated to a temperature range of about 2,000° F. to about 2,200° F. for a time sufficient to reduce about 80 percent to about 99 percent of the iron to the metallic state. The pellets are cooled to below 300° F. and discharged from the kiln.

The weather-resistant superfluxed metallized iron pellets contain about 40 percent to about 80 percent total iron, of which not less than about 80 percent is in the metallic state, about 12 percent to about 40 percent of calcium oxide and/or magnesium oxide, a slag phase containing 3 percent to 10 percent silica, about 0.5 percent to about 2.5 percent alumina, the remainder incidental impurities. The pellets have a base to acid ratio of about 2.5/1 to about 7/1. The pellets have an impervious shell of metallic iron and particles of calcium oxide and magnesium oxide surrounded by the metallic iron. The core of the pellets contains metallic iron, some iron oxide, calcio-magnesio wustite and a slag phase. The pellets are bonded by an interlocking of the metallic iron lattice, the slag phase and calcio-magnesio wustite. The calcium oxide and magnesium oxide are in a stable form.

14 Claims, 2 Drawing Figures

METHOD FOR PRODUCING WEATHER-RESISTANT SUPERFLUXED METALLIZED PELLETS FROM IRON-BEARING FINES AND A SUPERFLUXED METALLIZED PELLET PRODUCED THEREBY

BACKGROUND OF THE INVENTION

This invention is directed to a method for producing superfluxed weather-resistant metallized pellets containing metallic iron and to the pellets produced thereby.

Prior art attempts to recover iron-values contained in steel mill in-plant iron-bearing fines or from concentrates of iron ore have met with limited success. The fines and/or concentrates must be agglomerated before they can be used as charge materials. The pelletization, that is, balling and firing the agglomerates, of in-plant fines has not been entirely successful. In-plant fines which contain metallic iron, are too large to be balled and must be ground to the proper size. However, these in-plant fines resist grinding and form spherical granules which are considered too large to ball. In-plant fines which contain iron oxides are too small to be balled with consistency. For these reasons, the in-plant fines are usually agglomerated by sintering. Sintering the in-plant fines is an expensive, cumbersome process with inherent pollution problems.

The production of pellets containing flux materials in sufficient quantity to preclude flux additions along with the pellets to a metallurgical furnace has not been completely successful. When sufficient flux is added to iron-bearing fines, the flux combines with the gangue material in the fines forming low melting slags. The pellets "weep," that is, the liquid slags exude onto the surface of the pellets. As a result, when the pellets are fired in a rotary kiln, the kiln wall becomes coated with the liquid slags. The kiln "chokes" and must be shut down and cleaned, thereby losing production and increasing production costs. Firing the pellets in a grate-kiln combination causes blockage of the grate, resulting in poor firing efficiency and incomplete hardening of the pellets. Firing the pellets in a rotary hearth furnace causes a layer of the slag to form on the hearth, insulating the hearth, thereby decreasing the heating rate resulting in poorly hardened pellets. Then, too, prior art pellets made with flux materials in them have not been durable enough to withstand the rigors attendant to handling during transport and charging into a furnace.

It is an object of this invention to provide weather-resistant superfluxed metallized iron pellets which have good resistance to abrasion and sufficient strength to resist degradation during transport and charging into a furnace.

It is another object of this invention to provide weather-resistant superfluxed metallized iron pellets which the metallization of iron is not less than 80 percent and which have good resistance to hydration.

It is another object of this invention to provide weather-resistant superfluxed metallized iron pellets which have a base to acid ratio higher than heretofore attainable.

It is another object of this invention to provide a method for producing weather-resistant superfluxed metallized iron pellets from iron-bearing fines, for example, iron ore concentrates.

It is another object of this invention to produce weather-resistant superfluxed metallized iron pellets from steel mill in-plant fines which heretofore could not be utilized to recover iron values therein.

SUMMARY OF THE INVENTION

Broadly, the weather-resistant superfluxed metallized iron pellets of the invention contain not less than about 40 percent to about 80 percent total iron, not less than 80 percent of which is metallic iron, not less than 12 percent of a flux material, not more than 10 percent silica, not more than about 2.5 percent alumina, a base to acid ratio of not less than about 2.5/1 and having good resistance to hydration, reoxidation and abrasion.

The method of producing the weather-resistant superfluxed metallized iron pellets of the invention includes forming a mix of iron-bearing fines, a flux and a solid reducing agent, balling the mix and heating the balled mix in a furnace to a temperature for a time in the presence of an external solid reducing agent and flux material to obtain not less than about 80 percent metallization of the total iron contained therein.

DESCRIPTION OF THE DRAWING

FIG. 1 is a reproduction of a photomicrograph of the microstructure taken at 100 magnifications, of the shell of a pellet produced by the method of the invention. A metallized iron network is shown by the white areas, M. The metallized iron network surrounds black areas, L, rich in lime. Slag formed by the reaction between some of the flux and the impurities, for example silica and alumina, in the raw materials is shown at light gray areas, S. The dark gray areas, V, are voids.

FIG. 2 is a reproduction of a photomicrograph taken at 100 magnifications of the microstructure of the core of a pellet produced by the method of the invention. Metallized iron is shown as white areas, M. The large light gray areas, W, are wustite which is enriched in lime and magnesia. The wustite, W, is bonded by darker gray areas, S, which are slag. The very dark gray areas, V, are voids.

PREFERRED EMBODIMENT OF THE INVENTION

We have produced weather-resistant superfluxed metallized iron pellets containing a high degree of metallization and an amount of a fluxing material and base to acid ratio heretofore unattainable from iron-bearing fines, for example, in-plant steel mill fines or iron ore fines.

In-plant steel mill iron-bearing fines, such as mill sludges, scarfer-spittings, basic oxygen furnace fume, open-hearth fume, blast furnace flue dust, or concentrated iron ore fines, such as hematitic ores, can be used to produce the weather-resistant superfluxed pellets of the invention. The in-plant steel mill iron-bearing fines which contain metallic iron and/or iron oxides are used in a full range of sizes from +100 mesh to −10 microns. The size range is obtained by mixing up to 15 percent of +100 mesh material, such as scarfer spittings and mill scale which contain metallic iron and the remainder, particles having a size of −100 mesh to +325 mesh, for example, basic oxygen fume, blast furnace flue dust, and open hearth fume which contain iron oxides.

Typical chemical compositions of the steel mill in-plant fines are shown below:

| In-plant fines | Chemical composition (percent) dry basis ||||||| 
|---|---|---|---|---|---|---|---|
| | Fe total | SiO$_2$ | Al$_2$O$_3$ | CaO | MgO | S | C |
| Pellet fines | 67.2 | 2.80 | 0.39 | 0.38 | 0.26 | 0.005 | 0.09 |
| Blast furnace flue dust (dry) | 52.3 | 6.40 | 1.03 | 3.50 | 1.20 | 0.145 | 11.4 |
| BOF-fume | 61.0 | 1.33 | 0.3 | 3.55 | 0.57 | 0.044 | 0.91 |
| Scarfer spittings | 71.2 | 0.54 | | 0.28 | 0.20 | 0.016 | |
| Mill scale | 68.9 | 3.15 | 0.73 | 0.15 | 0.20 | | 2.90 |
| Cold mill sludge | 35.3 | 2.70 | 0.58 | 7.10 | 5.30 | 2.32 | |

The iron-bearing materials are mixed with at least one flux material, such as limestone and/or dolomite, and a solid carbonaceous reducing agent, such as anthracite coal, coke, coke breeze, and graphite, to make a mix containing from about 56 percent to about 85 percent iron-bearing fines, about 12 percent to about 40 percent of at least one flux material and about 3 percent to about 4 percent of at least one solid reducing agent. The mix is balled on an apparatus such as a balling disc, drum, or cone. Of course the necessary moisture, for example, about 8 percent to about 12 percent, is added to the mix to obtain the necessary balling consistency. The iron-bearing particles have a Blaine surface area of about 2,100 cm$^2$/gram necessary for good balling. The balls, a solid carbonaceous reducing agent, such as anthracite coal, coke, graphite, and at least one flux material such as calcium carbonate, magnesium carbonate and/or dolomite, are charged into one end of a rotary kiln. The charged materials are charged in a weight ratio of about 100 pounds of moist balls: about 5 pounds of the flux material: about 100 pounds to about 200 pounds of the solid reducing agent.

As the charged materials travel from the charge end to the discharge end of the rotary kiln, they are heated. The moist balls are gradually dried near the charge end which is at a temperature of about 500° F. The dried balls are heated to about 1,900° F. At this temperature, the flux materials are calcined and about 90 percent of the total iron is reduced to the ferrous state. The temperature is then raised to between about 2,000° F. to about 2,200° F. About 80 percent to about 99 percent of the iron oxide in the pellets is reduced to metallic iron by the solid reducing agent in the balls and in the charged materials. The calcium carbonate and/or magnesium carbonate are converted to calcium oxide and magnesium oxide, respectively. If dolomite, a double carbonate of calcium and magnesium CaMg(CO$_3$)$_2$ is added as the flux material, the dolomite is calcined and calcium oxide and magnesium oxide are formed in the pellets. The external flux material in the kiln charge is also calcined. The external flux material is used as a desulfurizing agent to absorb sulfur from the solid carbonaceous reductant in the charge and does not enter into the reactions internally in the pellets. The pellets are cooled to less than 300° F. in a reducing or inert atmosphere, for example, N$_2$ or argon, in a cooling chamber and are then discharged to storage or use. It was found that about 80 percent to 99 percent metallization occurs in the pellet but it is preferred to obtain not less than 90 percent metallization in the pellet. The gangue materials, for example about 3 percent to about 10 percent silica and about 0.5 percent to about 2.5 percent alumina, are fluxed by the fluxing material in the balls. The flux material which did not react with the gangue is protected by a layer of metallic iron which forms around the flux particles. In this manner the flux material is protected from hydration. The flux material in turn being in a stable condition, protects the iron from reoxidation. A base to acid ratio of about 2.5/1 to about 7/1 is formed in the pellets.

Of course, a binder such as bentonite, lignin and/or molasses may be added to the mix of steel mill in-plant iron-bearing fines, a flux material and a solid reducing agent. The above mentioned binder materials aid in binding the dried balls together when they are heated through the temperature range of about 250° F. to about 350° F. wherein the dried balls are weak and susceptible to degradation by dusting.

It is also within the scope of this invention to produce pellets from a mix to which a solid reductant has not been added, particularly if the flux levels are about 12 percent to 18 percent of the mix. The dried balls are then heated under oxidizing conditions to within a temperature range of about 2,200° F. to about 2,370° F. The base to acid ratio produced in the pellets in this manner is not greater than about 4.2/1.

In this specification and claims wherever percentages are noted such percentages are on a weight basis unless otherwise noted.

The retardation of metallization at the low calcining temperature and the substantially complete metallization at high temperature, preferably 2,000° F., results in the formation of a metallic iron lattice structure in the pellets of the invention.

The superfluxed metallized pellets are bonded by the interlocking of the metallic iron lattice, a slag phase and calcio-magnesio wustite. Iron oxide (wustite-FeO) is formed during metallization. A portion of the wustite (FeO) forms a solid solution (calcio-magnesio wustite) with calcium oxide (CaO) and magnesium oxide (MgO). As heating continues, the wustite is reduced to metallic iron. The metallic iron forms a shell around the calcium oxide (CaO) and magnesium oxide (MgO) particles which had formed the solid solution with the wustite. The calcium oxide (CaO) and magnesium oxide (MgO) are not available for reaction with the gangue (silica - SiO$_2$ and alumina - Al$_2$O$_3$) in the pellets. The particles of calcium oxide (CaO) and magnesium oxide (MgO) not protected by the metallic iron react with the silica (SiO$_2$) and alumina (Al$_2$O$_3$) to form a glassy slag phase. The particles of calcium oxide (CaO) and the magnesium oxide (MgO) are in a stable form and inhibit reoxidation of the metallic iron. The sulfur in the pellet is associated with calcium which is available to react with silica (SiO$_2$) and alumina (Al$_2$O$_3$) and is found in the slag phase. An impervious shell of metallic iron is formed around the outer surface of the pellet.

In a specific example of the invention, a mix suitable for balling was made. The mix was made of the following constituents:

| Constituent | % of Mix |
|---|---|
| Dolomite | 26.7 |
| Pellet Fines | 27.2 |
| Limestone | 13.4 |
| Mill Scale | 8.7 |
| Scarfer Spittings | 6.6 |
| Blast Fce. Flue Dusts | 10.4 |
| Metallic Slag Fines (Contractor fines) | 1.0 |

| | |
|---|---|
| BOF Fines | 4.4 |
| Hot and Cold Mill Sludge | 1.6 |
| | 100.0 |

The addition of a solid carbonaceous reductant was not required because the blast furnace flue dusts contained a sufficient amount of carbon to obtain the desired 3 percent to 4 percent in the mix. The mix was formed into balls having a diameter of about five-eighths inch to three-eighths inch. About 500 grams of dried green balls, 400 grams of coke breeze and 40 grams of dolomite [$CaMg(CO_3)_2$] were charged into a small pilot plant rotary kiln. The charged materials were heated from ambient temperature to 1,750° F. in about 20 minutes. The temperature of the balls was raised from 1,750° F. to 2,100° F. in 10 minutes. The balls were held at 2,100° F. for about 120 minutes. The pellets were cooled to 200° F. in 50 minutes. The pellets were discharged from the kiln.

As shown in FIG. 1, microscopic examination of a pellet showed an interlocked structure of metallic iron, white areas, M, surrounding particles of calcium oxide (CaO) and magnesium oxide (MgO), black areas, L, and slag, light gray areas, S, with calcium oxide (CaO) rich areas. A shell of metallic iron was formed around the pellet. As noted in FIG. 2, small areas of wustite, large light gray areas, W, enriched in calcium oxide (CaO) and magnesium oxide (MgO) were noted in the core of the pellet. The metallized iron is shown as white areas, M, and the glassy slag is shown as darker gray areas, S. About 95 percent metallization was realized in the pellet.

As noted previously, concentrates of iron ore can be used to produce the pellets of the invention. Following is a specific example in which a hematitic type concentrated iron ore is used.

A mix of 57.4 percent hematite concentrated iron ore (Tilden concentrate), 25.8 percent dolomite, 12.5 percent limestone, and 4.3 percent pulverized coke was made. About 96 pounds of a lignin slurry which contained 50 percent solids was added per ton of mix. The mix was balled. The green balls were charged into a furnace and heated to within a temperature range of 212° F. to 250° F. to dry the balls. The dried balls were removed from the furnace and charged into a kiln. The kiln charge included 505 grams of dried balls, 250 grams of coke, and 25 grams of dolomite. The charged materials were heated to about 2,100° F. in a neutral atmosphere in about 37 minutes. The neutral atmosphere was turned off at 2,100° F. An atmosphere reducing in nature was formed in the balls and surrounding the balls by the gasification of the solid carbonaceous reductant, coke, added in the charge material. The balls were held at 2,100° F. for 2 hours. The pellets were cooled to 250° F. in a nitrogen (neutral) atmosphere. The pellets were found to have a microstructure similar to that described in the first specific example. About 96.8 percent metallization was achieved in the pellets. The average compression strength of the pellets was 298 pounds per pellet.

We claim:

1. A method for producing a weather-resistant superfluxed metallized iron pellet characterized by good resistance to hydration, said pellet consisting of about 40 percent to about 80 percent iron, about 12 percent to about 40 percent of at least one flux taken from the group consisting of calcium oxide and magnesium oxide, about 3 percent to about 10 percent silica and about 0.5 percent to about 2.5 percent alumina, and having a base to acid ratio of about 2.5/1 to about 7/1, and in which not less than 80 percent of the iron present in said superfluxed pellet is present as metallic iron, said method comprising:
   a. providing a mix of about 56 percent to about 85 percent iron-bearing fines, about 12 percent to about 40 percent of at least one flux taken from the group consisting of calcium carbonate, magnesium carbonate, and dolomite, and about 3 percent to about 4 percent of a solid reductant,
   b. forming the mix into balls,
   c. charging a mixture of said balls, an external flux material and an external solid reductant into the same end of a rotary kiln,
   d. heating the charged mixture of balls, external flux material and external solid reductant of step (c) in said kiln for a time at a temperature sufficient to calcine the flux material therein,
   e. then increasing the temperature of said charged mixture of balls, external flux material and external solid reductant of step (d) in said kiln to within a temperature range of about 2,000° F. to 2,100° F. for a time sufficient to reduce about 80 percent to about 99 percent of the iron in the balls to metallic iron and form pellets,
   f. cooling the resulting pellets to about 200° F., and
   g. discharging the pellets from the kiln.

2. The method of claim 1 in which the solid reductant of step (c) is coke breeze.

3. The method of claim 1 in which the flux of step (a) is dolomite.

4. The method of claim 1 in which the flux of step (a) is calcium carbonate.

5. The method of claim 1 in which the flux of step (a) is magnesium carbonate.

6. The method of claim 1 in which the flux of step (a) is calcium carbonate and magnesium carbonate.

7. A method for producing a weather-resistant superfluxed metallized iron pellet characterized by having good resistance to hydration, said pellet consisting of about 40 percent to about 80 percent iron, about 12 percent to about 40 percent of at least one flux taken from the group consisting of calcium oxide and magnesium oxide, about 3 percent to about 10 percent silica, about 0.5 percent to about 2.5 percent alumina, the remainder incidental impurities, and having a base to acid ratio of about 2.5/1 to about 7.0/1, and wherein about 90 percent of said iron contained in said superfluxed pellet is present as metallic iron, said method comprising:
   a. providing a mix of about 56 percent to about 85 percent iron-bearing fines, about 12 percent to about 40 percent of at least one flux taken from the group consisting of calcium carbonate, magnesium carbonate and dolomite and about 3 percent to about 4 percent of a solid reductant,
   b. forming the mix into balls,
   c. drying the balls,
   d. charging a mixture of said balls, an external flux and an external solid reductant in a weight ratio of about 100 pounds:5 pounds:100/200 pounds respectively into the same end of a rotary kiln,
   e. heating the charged mixture of step (d) within the kiln from ambient temperature to about 1,750° F. to between about 2,000° F. to about 2,100° F. in about 10 minutes and holding the temperature at about 2,100° F. for about 120 minutes to form pellets, f. cooling the resulting pellets to about 200° F., and g. discharging the pellets from the kiln.

8. A weather-resistant superfluxed metallized iron pellet characterized by having good resistance to hydration, said pellet consisting of about 40 percent to about 80 percent total iron, about 12 percent to about 40 percent of at least one flux taken from the group consisting of calcium oxide and magnesium oxide, about 3 percent to about 10 percent silica, and about 0.5 percent to about 2.5 percent alumina, and wherein about 90 percent of said iron in said superfluxed pellet is present as metallic iron.

9. The superfluxed pellet of claim 8 in which the pellet is bonded by interlocking a metallic iron lattice, a slag phase and calcio-magnesio wustite.

10. The superfluxed pellet of claim 9 in which metallic iron is formed into an impervious shell around the pellet and particles of calcium oxide and magnesium oxide are coated with metallic iron.

11. A weather-resistant superfluxed metallized iron pellet characterized by having good resistance to hydration made from iron-bearing fines, said pellet consisting of about 40 percent to about 80 percent total iron, about 12 percent to about 40 percent of at least one flux taken from the group consisting of calcium oxide and magnesium oxide, about 3 percent to about 10 percent silica, about 0.5 percent to about 2.5 percent alumina, at least 90 percent of said iron in said superfluxed pellet being present as metallic iron, the remainder of the pellet being composed of incidental impurities, said pellet having a microstructure comprised of an impervious shell of metallic iron lattice and particles of calcium oxide and magnesium oxide surrounded by the metallic iron and a core containing metallic iron, iron oxide, calcio-magnesio wustite and a slag phase, said pellet being bonded by the interlocking of the metallic iron, slag phase and the calcio-magnesio wustite.

12. The method of claim 1 in which the temperature in step (d) is between about 1,750° F. and 2,100° F.

13. The method of claim 12 in which the time at temperature is about 20 minutes.

14. The method of claim 1 in which the time at temperature in step (e) is about 120 minutes.

* * * * *